US008583352B2

(12) United States Patent
Klooster et al.

(10) Patent No.: US 8,583,352 B2
(45) Date of Patent: Nov. 12, 2013

(54) METHOD AND SYSTEM FOR HOLD PATH COMPUTATION TO MEET REQUIRED HOLD DEPARTURE TIME

(75) Inventors: Joel Kenneth Klooster, Grand Rapids, MI (US); Joachim Karl Ulf Hochwarth, Grand Rapids, MI (US)

(73) Assignee: GE Aviation Systems, LLC, Grand Rapids, MI (US)

(*) Notice: Subject to any disclaimer, the term of this patent is extended or adjusted under 35 U.S.C. 154(b) by 432 days.

(21) Appl. No.: 12/951,303

(22) Filed: Nov. 22, 2010

(65) Prior Publication Data

US 2012/0130626 A1 May 24, 2012

(51) Int. Cl.
*G01C 21/00* (2006.01)

(52) U.S. Cl.
USPC ................... 701/120; 701/3; 701/14; 701/23; 701/26; 701/122; 701/408; 701/416; 701/420; 701/423; 701/431; 701/465; 340/945; 340/971; 244/75.1; 244/175; 244/181

(58) Field of Classification Search
None
See application file for complete search history.

(56) References Cited

U.S. PATENT DOCUMENTS

| | | | | |
|---|---|---|---|---|
| 4,154,190 | A * | 5/1979 | Utgoff | 116/335 |
| 4,774,670 | A | 9/1988 | Palmieri | |
| 5,025,382 | A * | 6/1991 | Artz | 701/120 |
| 5,121,325 | A | 6/1992 | DeJonge | |
| 5,247,440 | A | 9/1993 | Capurka et al. | |
| 5,398,186 | A | 3/1995 | Nakhla | |
| 5,408,413 | A | 4/1995 | Gonser et al. | |
| 5,526,265 | A | 6/1996 | Nakhla | |
| 5,544,225 | A | 8/1996 | Kennedy, III et al. | |
| 5,574,647 | A | 11/1996 | Liden | |
| 5,579,376 | A | 11/1996 | Kennedy, III et al. | |
| 5,694,322 | A | 12/1997 | Westerlage et al. | |
| 5,699,275 | A | 12/1997 | Beasley et al. | |
| 5,713,007 | A | 1/1998 | Lecomte et al. | |
| 5,724,243 | A | 3/1998 | Westerlage et al. | |
| 5,734,981 | A | 3/1998 | Kennedy, III et al. | |
| 5,751,609 | A | 5/1998 | Schaefer, Jr. et al. | |
| 5,771,455 | A | 6/1998 | Kennedy, III et al. | |
| 5,842,142 | A | 11/1998 | Murray et al. | |

(Continued)

OTHER PUBLICATIONS

Arthur P. Smith et al., "Management of Holding Patterns: A Potential ABS-B Application", Digital Avionics Systems Conf., Oct. 26, 2008, pp. 3.D. 2-1.

(Continued)

*Primary Examiner* — Jonathan M Dager
(74) *Attorney, Agent, or Firm* — Matthew Hayden, Esq.; Armstrong Teasdale LLP

(57) ABSTRACT

A method and hold path computation system for automatically generating a hold path for an aircraft flying in a holding pattern, wherein the holding pattern is defined by one or more orbits within a selectable holding area are provided. The system includes a processor configured to receive a hold departure time indicating a time the aircraft is to leave the hold path to meet a required time of arrival (RTA) at a waypoint, determine a present position of the aircraft within the holding pattern, and determine an amount of time to complete a current hold orbit. The processor is also configured such that if the determined amount of time to complete a current hold orbit is less than or equal to the hold departure time, maintain the aircraft flying in the holding pattern and determine an amount of time by which to shorten the next orbit to exit the holding pattern at the hold departure time.

20 Claims, 3 Drawing Sheets

(56) References Cited

U.S. PATENT DOCUMENTS

| | | | | |
|---|---|---|---|---|
| 5,845,227 | A | 12/1998 | Peterson | |
| 5,890,101 | A | 3/1999 | Schaefer, Jr. et al. | |
| 5,970,481 | A | 10/1999 | Westerlage et al. | |
| 5,987,377 | A | 11/1999 | Westerlage et al. | |
| 5,987,397 | A | 11/1999 | McCool et al. | |
| 6,009,330 | A | 12/1999 | Kennedy, III et al. | |
| 6,112,141 | A * | 8/2000 | Briffe et al. | 701/14 |
| 6,167,627 | B1 * | 1/2001 | Wilder et al. | 33/1 SD |
| 6,240,295 | B1 | 5/2001 | Kennedy, III et al. | |
| 6,295,449 | B1 | 9/2001 | Westerlage et al. | |
| 6,408,307 | B1 | 6/2002 | Semple et al. | |
| 6,415,291 | B2 | 7/2002 | Bouve et al. | |
| 6,507,782 | B1 | 1/2003 | Rumbo et al. | |
| 6,510,186 | B1 | 1/2003 | Chen et al. | |
| 6,510,383 | B1 | 1/2003 | Jones | |
| 6,531,978 | B2 | 3/2003 | Tran | |
| 6,549,594 | B1 | 4/2003 | Chen et al. | |
| 6,584,400 | B2 | 6/2003 | Beardsworth | |
| 6,600,991 | B1 | 7/2003 | Jardin | |
| 6,604,030 | B1 | 8/2003 | Davis et al. | |
| 6,633,810 | B1 * | 10/2003 | Qureshi et al. | 701/467 |
| 6,646,588 | B2 | 11/2003 | Tran | |
| 6,658,349 | B2 | 12/2003 | Cline | |
| 6,678,587 | B2 * | 1/2004 | Miller | 701/3 |
| 6,707,475 | B1 * | 3/2004 | Snyder | 715/771 |
| 6,847,866 | B2 | 1/2005 | Gaier | |
| 6,970,784 | B2 | 11/2005 | Shinagawa | |
| 7,117,075 | B1 | 10/2006 | Larschan et al. | |
| 7,272,491 | B1 | 9/2007 | Berard | |
| 7,283,895 | B2 | 10/2007 | Bouchet | |
| 7,370,790 | B2 * | 5/2008 | Martincikova et al. | 235/61 NV |
| 7,437,225 | B1 | 10/2008 | Rathinam | |
| 7,487,039 | B2 * | 2/2009 | Rumbo et al. | 701/528 |
| 7,693,621 | B1 * | 4/2010 | Chamas | 701/16 |
| 7,844,372 | B2 * | 11/2010 | Chen et al. | 701/11 |
| 7,876,238 | B2 * | 1/2011 | Vandenbergh et al. | 340/971 |
| 7,903,000 | B2 * | 3/2011 | Hammack et al. | 340/974 |
| 8,078,395 | B2 * | 12/2011 | Builta et al. | 701/529 |
| 8,132,760 | B2 * | 3/2012 | Haas | 244/137.1 |
| 8,223,119 | B1 * | 7/2012 | Krenz et al. | 345/156 |
| 8,244,453 | B2 * | 8/2012 | Lacombe et al. | 701/122 |
| 8,280,564 | B2 * | 10/2012 | Sacle et al. | 701/4 |
| 8,396,615 | B2 * | 3/2013 | Caillaud et al. | 701/11 |
| 2002/0166246 | A1 * | 11/2002 | Ganivet | 33/1 SB |
| 2002/0193915 | A1 * | 12/2002 | Miller | 701/3 |
| 2004/0122567 | A1 * | 6/2004 | Gaier | 701/4 |
| 2004/0230351 | A1 * | 11/2004 | Rumbo et al. | 701/3 |
| 2005/0004745 | A1 * | 1/2005 | Rumbo et al. | 701/200 |
| 2006/0012492 | A1 * | 1/2006 | Degidio | 340/971 |
| 2006/0020374 | A1 * | 1/2006 | Kenner | 701/3 |
| 2007/0040011 | A1 * | 2/2007 | Martincik et al. | 235/61 NV |
| 2007/0100538 | A1 | 5/2007 | Wise et al. | |
| 2008/0243314 | A1 | 10/2008 | Ridenour | |
| 2009/0005918 | A1 * | 1/2009 | Sacle et al. | 701/3 |
| 2010/0030400 | A1 * | 2/2010 | Komer et al. | 701/3 |
| 2010/0114407 | A1 | 5/2010 | Klooster et al. | |
| 2010/0131124 | A1 | 5/2010 | Klooster | |
| 2010/0274419 | A1 | 10/2010 | Lacombe et al. | |

OTHER PUBLICATIONS

Search Report and Written Opinion from corresponding EP Application No. 11188734.5, Mar. 15, 2012.

* cited by examiner

METHOD AND SYSTEM FOR HOLD PATH COMPUTATION TO MEET REQUIRED HOLD DEPARTURE TIME

BACKGROUND OF THE INVENTION

The field of the invention relates generally to controlling aircraft in flight, and more specifically, to a method and system for computing a holding pattern flight path to meet a required holding pattern departure time.

In today's airspace, delays due to congestion are common. When the number of aircraft entering an airspace exceeds the number of aircraft that can be safely handled by the available Air Traffic resources (limited by the number of controllers and type of automation), delays are imposed on aircraft. These delays are typically achieved by instructing aircraft to reduce speed, using radar vectors, or by orbital holding. In the case of orbital holding, the Flight Management System (FMS) computes the track over ground as a sequence of straight segments and curves, in the form of a "racetrack". The straight segment is typically a fixed time or, more frequently, a fixed distance, and the curved segment is flown at a constant bank angle or constant radius to transition from one straight segment to the next.

A problem with current holding operations is that the air traffic controller must estimate where and when to command the aircraft to leave the holding pattern in order to meet a time (for metering or merging with other aircraft in a defined arrival sequence) at a point after leaving the hold, such as within the arrival procedure. Due to the geometry of the holding pattern, it is difficult for the controller to estimate when the aircraft will leave the holding pattern or how long it will take the aircraft to reach the desired arrival point after leaving the hold, because of this uncertainty there is often a large amount of error between when the controller wants the aircraft to arrive at the desired point after leaving the hold and when the aircraft actually arrives there. Currently, air traffic controllers estimate, based on experience, using an average flight time to determine when to ask an aircraft to leave its current holding pattern. However, the flight time will vary significantly based on where the aircraft leaves the hold, introducing uncertainty which requires additional separation buffers. This uncertainty results in decreased capacity and increased fuel burn for following aircraft due to their increased time spent in the holding pattern.

At least some known methods to address this problem include a method to determine the shortest path to exit the hold. However, this method does not use a required crossing time or required exit time to compute the necessary hold path; its objective is simply to minimize the distance required to exit the hold.

BRIEF DESCRIPTION OF THE INVENTION

In one embodiment, a hold path computation system for automatically generating a hold path for an aircraft flying in a holding pattern, wherein the holding pattern is defined by one or more orbits within a selectable holding area includes a processor configured to receive a hold departure time indicating a time the aircraft is to leave the hold path to meet a required time of arrival (RTA) at a waypoint, determine a present position of the aircraft within the holding pattern, and determine an amount of time to complete a current hold orbit. The process is also configured such that if the determined amount of time to complete a current hold orbit is less than the time remaining to the required hold departure time, maintain the aircraft flying in the holding pattern for at least one more orbit and determine an amount of time by which to shorten the next orbit to exit the holding pattern at the hold departure time.

In another embodiment, a method of computing a holding pattern flight path to meet a required holding pattern departure time includes a) receiving for an aircraft flying in a holding pattern a hold departure time wherein the holding pattern is defined by one or more orbits within a selectable holding area, b) determining a present position of the aircraft within the holding pattern, and c) determining an amount of time to complete a current hold orbit. The method also includes d) if the determined amount of time to complete a current hold orbit is less than the time remaining to the required hold departure time, maintaining flying in the holding pattern and returning to step b) and e) determining an amount of time by which to shorten the next orbit to exit the holding pattern at the hold departure time.

In yet another embodiment, a non-transient computer-readable medium includes a computer program that causes a processor to a) receive by an aircraft flying in a holding pattern a hold departure time wherein the holding pattern is defined by one or more orbits within a selectable holding area and b) determine a present position of the aircraft within the holding pattern. The computer program also causes a processor to c) determine an amount of time to complete a current hold orbit, d) if the determined amount of time to complete a current hold orbit is less than the time remaining to the required hold departure time, maintaining flying in the holding pattern and returning to step b), and e) determine an amount of time by which to shorten the next orbit to exit the holding pattern at the hold departure time.

BRIEF DESCRIPTION OF THE DRAWINGS

FIG. 1 is a schematic diagram of a flight path of an exemplary holding pattern in accordance with an exemplary embodiment of the present invention;

FIG. 2 is a flow diagram of an exemplary method of computing a hold path to meet a required hold departure time; and FIG. 3 is a simplified schematic diagram of Flight Management System (FMS) in accordance with an exemplary embodiment of the present invention.

DETAILED DESCRIPTION OF THE INVENTION

The following detailed description illustrates embodiments of the invention by way of example and not by way of limitation. It is contemplated that the invention has general application to analytical and methodical embodiments of automatically computing a holding pattern departure time to meet a required time of arrival (RTA) at a waypoint in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention facilitate reducing uncertainty associated with aircraft leaving holding patterns and reducing controller workload associated with manual computations by computing the most efficient way to leave a holding pattern at the time necessary to precisely meet a required time of arrival at a point.

Figure 1:
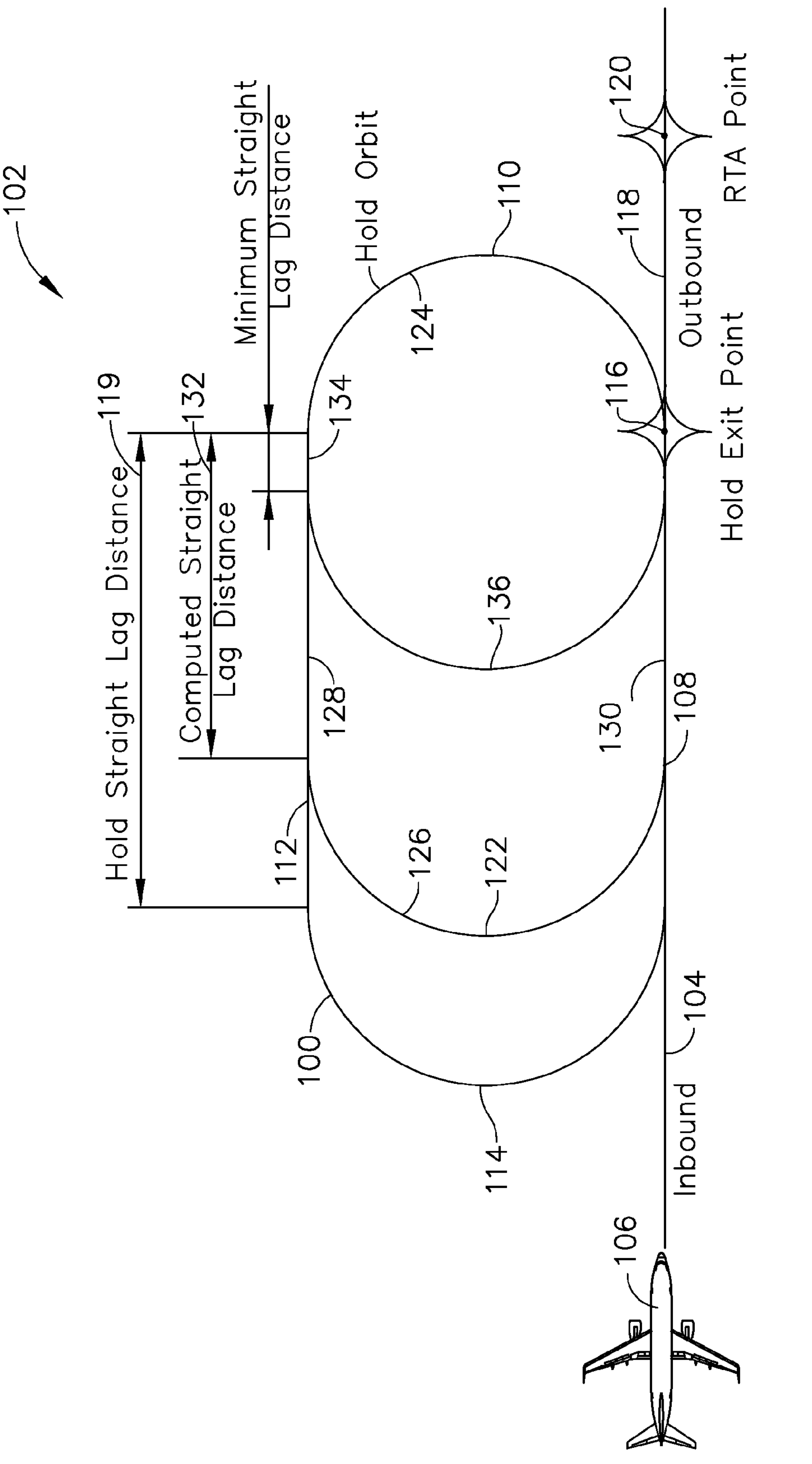
FIGS. 1-3 show exemplary embodiments of the method and system described herein.

FIG. 1 is a schematic diagram of a flight path 100 of an exemplary holding pattern 102 in accordance with an exemplary embodiment of the present invention. In the exemplary embodiment, flight path 100 includes an inbound leg 104 by which an aircraft 106 enters holding pattern 102. Flight path 100 also includes a first turn leg 110, a first straight leg 112, a second turn leg 114, a second straight leg 108, a Hold Exit Point 116, and an outbound leg 118 by which aircraft 106 exits holding pattern 102. When inbound traffic exceeds the capability of an airport or airspace, a controller may direct aircraft 106 to enter holding pattern 102 and to orbit holding pattern 102 along flight path 100 until the airport or airspace can accommodate aircraft 106. Holding pattern 102 may be defined by the controller or coded in a published procedure that is contained in a loadable navigation database and may be specified by a time or distance to fly straight legs 108 and 112 and a radius or bank angle for turn legs 110 and 114. Typically, a length 119 of each straight leg 108 and 112 are equal. The distance flown along each leg of flight path 100 may be determined by the time flown in the leg and a speed of the aircraft. Although shown as a "racetrack" or oval shape, holding pattern 102 may be configured differently and may include a plurality of straight legs and/or turn legs.

As aircraft 106 orbits around holding pattern 102, aircraft 106 periodically passes Hold Exit Point 116. A time to Hold Exit Point 116 from any point along flight path 100 may be calculated from a length of straight legs 108 and 112, a length of turn legs 110 and 114, a speed of aircraft 106, and any external influences, such as, but not limited to, wind speed and direction. When the controller needs to have aircraft 106 exit holding pattern 102, aircraft 106 may be located at any point along flight path 100. To exit holding pattern 102 in an orderly manner, a time for aircraft 106 to reach Hold Exit Point 116 is estimated and compared to the time that aircraft needs to be at Hold Exit Point 116 per the controller's command. The required time to reach Hold Exit Point 116 may be based on a required time to reach a required time of arrival (RTA) point 120 downstream from Hold Exit Point 116. If the predicted time for aircraft 106 to reach Hold Exit Point 116 is after the hold exit time commanded by the controller, a length of flight path 100 must be shortened to exit holding pattern 102 at the required exit time. Otherwise, at least one more orbit in flight path 100 is required.

Because the estimated time for aircraft 106 to reach Hold Exit Point 116 is after the required hold exit time, the orbit length must be shortened to exit holding pattern 102 at the required hold exit time. A shortened orbit 122 may be defined by two turn legs 124 and 126 sized similarly to turn legs 110 and 114, and shortened straight legs 128 and 130, which are a length 132 that is less than length 119. A minimum straight leg distance 134 may be used to define a minimum hold orbit 136 and may be selected as minimum wings level distance.

Figure 2:
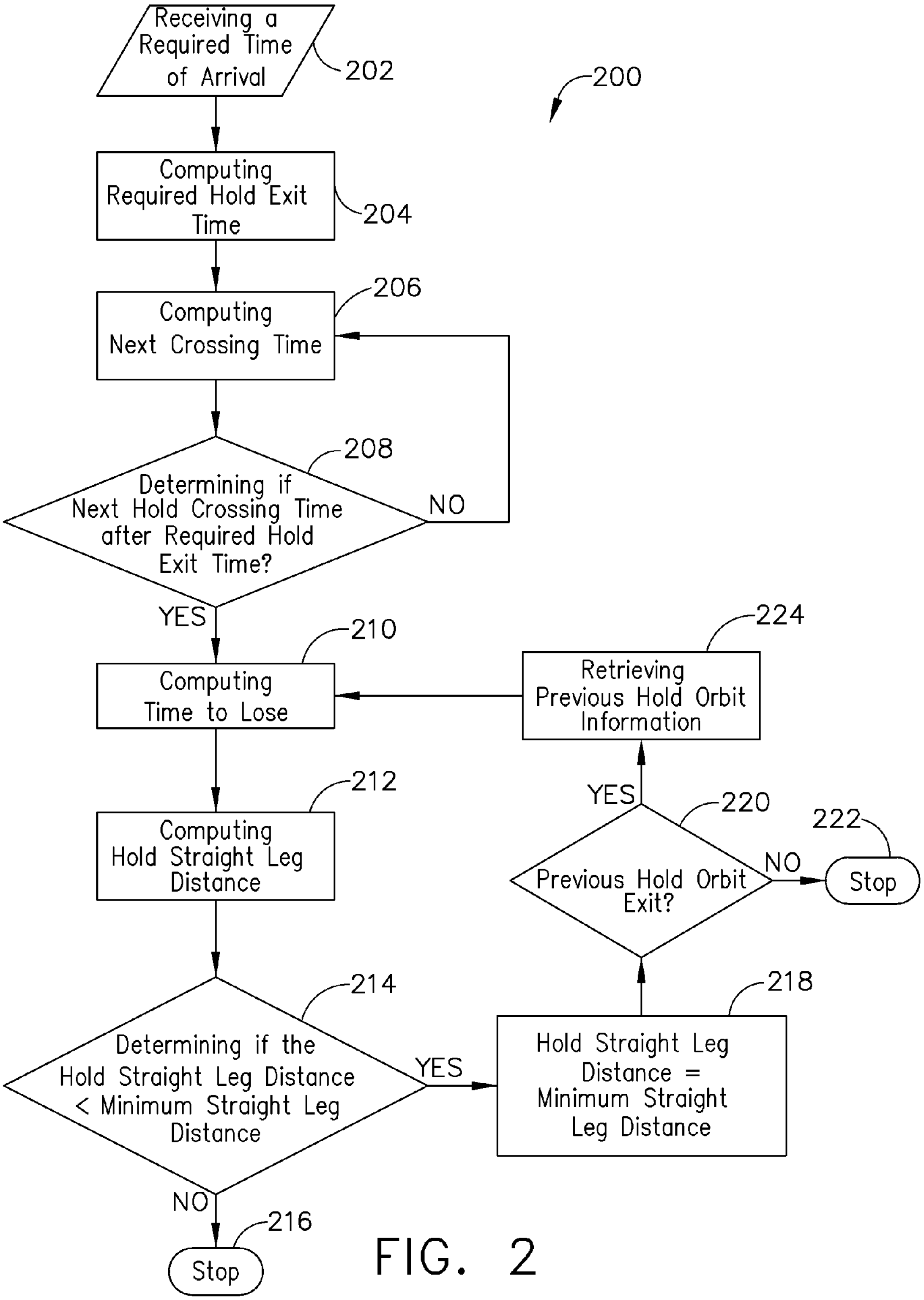

FIG. 2 is a flow diagram of an exemplary method 200 of computing a hold path to meet a required hold departure time. In the exemplary embodiment, method 200 includes receiving 202 a Required Time of Arrival (RTA), for example, an RTA at waypoint downstream of the current aircraft position is received by an aircraft orbiting in a holding pattern. The RTA time may be at Hold Exit Point 116 itself, in which case it represents the Hold Departure Time. In one embodiment, the RTA time is supplied by an air traffic controller or an operations planner. Method 200 also includes computing 204 a required hold exit time. If the RTA is assigned to Hold Exit Point 116, the hold exit time is equal to the RTA. Otherwise, the hold exit time may be computed given the RTA at a downstream waypoint and the estimated time to go from Hold Exit Point 116 to the RTA waypoint. Method 200 includes computing 206 a next hold crossing time. Using the aircraft's current position, target speed, wind and temperature data, the Estimated Time of Arrival to complete the current hold orbit is computed. Method 200 further includes determining 208 if the next hold crossing time occurs after the required hold exit time. If the predicted next hold crossing time occurs after the required hold exit time the orbit length must be shortened to exit the hold at the required exit time. Otherwise, at least one more orbit in the holding pattern is required and method 200 returns to computing 206 a next hold crossing time for the next hold orbit.

To shorten the current hold orbit, method 200 includes computing 210 an amount of time to lose for the orbit. for example, if the next hold crossing time is after the required hold exit time, the orbit length must be shortened to exit the holding pattern at the exit time required by the controller. in the exemplary embodiment, the time to lose in the holding pattern is computed as the difference between the estimated hold exit time and the required hold exit time. once the amount of time to lose from the orbit is determined, an amount of distance to shorten the orbit is determined by computing 212 a hold straight leg distance. to shorten the current hold orbit length, the distance of the two straight legs is shortened an equal amount. in an alternative embodiment, distance of the two straight legs may be shortened independently. in one embodiment, the new hold straight leg time is computed using the current hold straight leg time less one-half the amount of time to lose. the hold straight leg distance may be computed as hold straight leg time multiplied by the ground speed.

Method 200 includes determining 214 if the Hold Straight Leg Distance is less than a Minimum Straight Leg Distance. If the Hold Straight Leg Distance is less than the minimum allowable Straight Leg Distance, for example, a minimum wings level distance, then more than one hold orbit distance will be adjusted. Otherwise, the computation is complete 216. Method 200 also includes determining 218 if the Hold Straight Leg Distance is equal to the Minimum Straight Leg Distance and if so, the Hold Straight Leg Distance is set to be equal to the minimum limit Straight Leg Distance. Method 200 includes determining 220 if a previous Hold Orbit exists. If no previous Hold Orbit exists before the orbit currently being shortened, the hold exit time has been reduced as much as possible and cannot be reduced further; the computation is complete 222. Otherwise, if a previous Hold Orbit does exist method 200 includes retrieving 224 Previous Hold orbit information including, for example, but not limited to, straight leg distance and Next Hold Crossing Time related to the previous hold. The steps of computing 210 an amount of time to lose for the orbit and computing 212 a Hold Straight Leg Distance are repeated resulting in two shortened Hold Orbits where the first one uses the computed Hold Straight Leg Distance and the second uses the Minimum Straight Leg Distance. Optionally, these two distances could be averaged to create two equal Hold Orbits.

Figure 3:
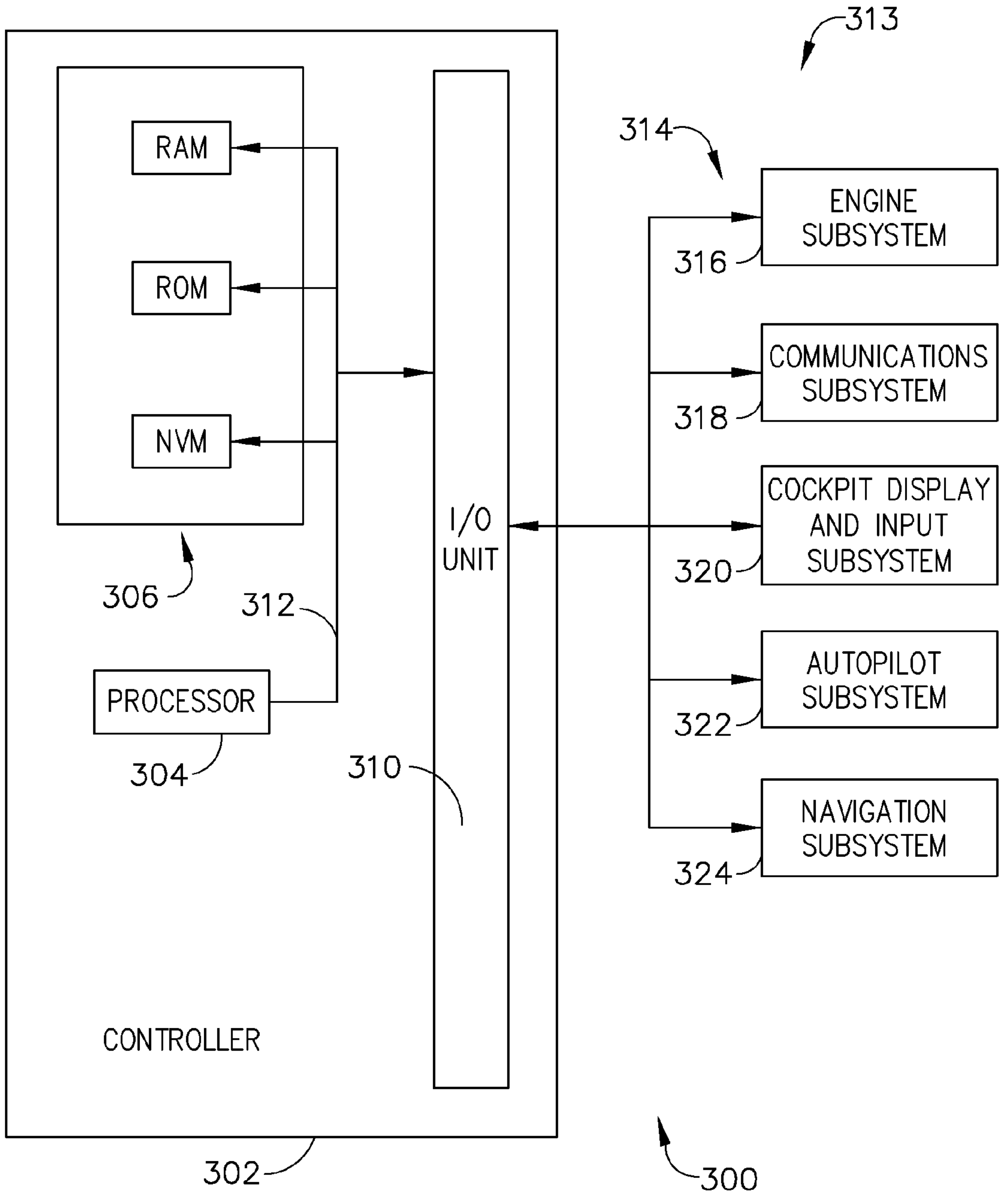

FIG. 3 is a simplified schematic diagram of Flight Management System (FMS) 300 in accordance with an exemplary embodiment of the present invention. In the exemplary embodiment, FMS 300 includes a controller 302 having a processor 304 and a memory 306. Processor 304 and memory 306 are communicatively coupled via a bus 312 to an input-output (I/O) unit 310 that is also communicatively coupled to a plurality of subsystems 313 via a bus 314 or a plurality of dedicated buses. In various embodiments, subsystems 313 may include an engine subsystem 316, a communications subsystem 318, a cockpit display and input subsystem 320, an autopilot subsystem 322 and/or a navigation subsystem 324.

Other subsystems not mentioned and more or fewer subsystems 313 may also be present. Cockpit display and input subsystem 320 includes the cockpit displays on which navigation information, aircraft flight parameter information, fuel and engine status and other information are displayed. Cockpit display and input subsystem 320 also includes various control panels via which the pilot or navigator may input the "Exit Hold" (EH) command into FMS 300 after having received, for example, an appropriate message from an air traffic controller. Autopilot subsystem 322 controls the flight surface actuators that change the path of the aircraft to follow the navigation directions provided by FMS 300. Navigation subsystem 324 provides current location information to controller 302. While FIG. 3 illustrates a particular architecture suitable for executing method 200 (shown in FIG. 2) other architectures for FMS 300 can also be used.

In the exemplary embodiment, computer instructions for executing method 200 reside in memory 306 along with map, waypoint, holding pattern and other information useful for determining the desired flight paths, waypoints, turns and other aircraft maneuvers. As FMS 300 executes method 200 it uses information from navigation subsystem 324 and route, holding pattern and aircraft performance information stored in memory 306. Such information is conveniently entered by the pilot or navigator via cockpit display and input subsystem 320 and/or obtained from non-transient computer-readable media, for example CD ROMs containing such information, signals received from offboard control systems, or a combination thereof.

FMS 300 may be configured to command autopilot subsystem 322 to move the flight control surfaces of the aircraft without direct human intervention to achieve flight along the desired shortened exit pathway. Alternatively, if the autopilot is disengaged, FMS 300 can provide course change directions or suggestions to the pilot via, for example, display in cockpit display and input subsystem 320, which when followed by the pilot, causes the plane to fly along the desired shortened exit pathway. Controller 302 may be embodied in a standalone hardware device or may be exclusively a firmware and/or software construct executing on FMS 300 or other vehicle system.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 304, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is provided by an efficient, automated computation on an aircraft to replace manual, and often inaccurate computations that are currently performed by the air traffic controller. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of computing a hold path to meet a required hold departure time provides a cost-effective and reliable means for providing an automated method to compute the optimal size of an airborne holding pattern in order to meet a required time of arrival at a waypoint ahead of the aircraft. The length of the straight portion of one more orbits in a "racetrack" holding pattern is adjusted to leave the hold at the necessary time to meet this time of arrival. More specifically, the methods and systems described herein facilitate minimizing extra time in a holding pattern requiring extra thrust and fuel burn. In addition, the above-described methods and systems facilitate reducing overall fuel consumption of aircraft in busy airspace and reducing controller workload. As a result, the methods and systems described herein facilitate operating aircraft in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A hold path computation system for automatically generating a hold path for an aircraft flying in a holding pattern, wherein the holding pattern is defined by one or more orbits within a selectable holding area and includes a substantially oval track including a plurality of straight legs and a plurality of turn legs, said system comprising a processor configured to:

receive a hold departure time indicating a time the aircraft is to leave the hold path;

determine a present position of the aircraft within the holding pattern;

determine an amount of time to complete a current hold orbit;

if the determined amount of time to complete a current hold orbit is less than the time remaining to the hold departure time, maintain the aircraft flying in the holding pattern;

determine an amount of time by which to shorten the next orbit to exit the holding pattern at the hold departure time; and determine a new holding pattern straight leg distance using a new holding pattern straight leg time multiplied by a speed of the aircraft.

2. A system in accordance with claim 1, wherein the hold departure time is computed to meet a required time of arrival (RTA) at a selectable waypoint.

3. A system in accordance with claim 1, wherein said processor is further configured to determine a difference between the time to complete the current hold orbit and the hold departure time.

4. A system in accordance with claim 1, wherein said processor is further configured to determine a new holding pattern straight leg time using a current holding pattern straight leg time less the amount of time by which to shorten the next orbit divided by a number of the plurality of straight legs.

5. A system in accordance with claim 1, wherein if a first new holding pattern straight leg distance is less than a minimum allowable straight leg distance, said processor is further configured to determine an adjustment to more than one holding pattern straight leg distance for more than one orbit.

6. A system in accordance with claim 5, wherein said processor is further configured to:
- set a holding pattern straight leg distance for a first of the more than one orbit to a minimum allowable straight leg distance; and
- determine a holding pattern straight leg distance for a second of the more than one orbit using a new holding pattern straight leg time multiplied by a speed of the aircraft.

7. A system in accordance with claim 5, wherein said processor is further configured to set the holding pattern straight leg distances for more than one orbit to an average of a minimum allowable straight leg distance and a determined holding pattern straight leg distance using a new holding pattern straight leg time multiplied by a speed of the aircraft.

8. A system in accordance with claim 5, wherein if a first new holding pattern straight leg distance is equal to a minimum allowable straight leg distance, said processor is further configured to adjust the first new holding pattern straight leg distance to be equal to the minimum allowable straight leg distance.

9. A method of computing a holding pattern flight path to meet a required holding pattern departure time, wherein the holding pattern includes a substantially oval track including a plurality of straight legs and a plurality of turn legs, said method comprising:
- a) receiving by an aircraft flying in a holding pattern a hold departure time wherein the holding pattern is defined by one or more orbits within a selectable holding area;
- b) determining a present position of the aircraft within the holding pattern;
- c) determining an amount of time to complete a current hold orbit;
- d) if the determined amount of time to complete a current hold orbit is less than the time remaining to the hold departure time, maintaining flying in the holding pattern and returning to step b);
- e) determining an amount of time by which to shorten the next orbit to exit the holding pattern at the hold departure time; and
- f) determining a new holding pattern straight leg distance using a new holding pattern straight leg time multiplied by a speed of the aircraft.

10. A method in accordance with claim 9, wherein receiving by an aircraft flying in a holding pattern a hold exit point comprises receiving by an aircraft flying in a holding pattern a hold exit point expressed in at least one of a time to reach the hold exit point and a distance to the hold exit point.

11. A method in accordance with claim 9, wherein determining an amount of time by which to shorten the next orbit comprises determining a difference between the time to complete the current hold orbit and the hold departure time.

12. A method in accordance with claim 9, further comprising determining a new holding pattern straight leg time using a current holding pattern straight leg time less the amount of time by which to shorten the next orbit divided by a number of the plurality of straight legs.

13. A method in accordance with claim 9, further comprising if a first new holding pattern straight leg distance is less than a minimum allowable straight leg distance, determining an adjustment to more than one holding pattern straight leg distance for more than one orbit.

14. A method in accordance with claim 13, wherein determining an adjustment to more than one holding pattern straight leg distance for more than one orbit comprises:
- setting a holding pattern straight leg distance for a first of the more than one orbit to a minimum allowable straight leg distance; and
- determining a holding pattern straight leg distance for a second of the more than one orbit using a new holding pattern straight leg time multiplied by a speed of the aircraft.

15. A method in accordance with claim 13, wherein determining an adjustment to more than one holding pattern straight leg distance for more than one orbit comprises setting the holding pattern straight leg distances for more than one orbit to an average of a minimum allowable straight leg distance and a determined holding pattern straight leg distance using a new holding pattern straight leg time multiplied by a speed of the aircraft.

16. A method in accordance with claim 13, further comprising if a first new holding pattern straight leg distance is equal to a minimum allowable straight leg distance, adjusting the first new holding pattern straight leg distance to be equal to the minimum allowable straight leg distance.

17. A non-transient computer-readable medium that includes a computer program that causes a processor to:
- a) receive by an aircraft flying in a holding pattern a hold departure time wherein the holding pattern is defined by one or more orbits within a selectable holding area and includes a substantially oval track including a plurality of straight legs and a plurality of turn legs;
- b) determine a present position of the aircraft within the holding pattern;
- c) determine an amount of time to complete a current hold orbit;
- d) if the determined amount of time to complete a current hold orbit is less than the time remaining to the hold departure time, maintaining flying in the holding pattern and returning to step b);
- e) determine an amount of time by which to shorten the next orbit to exit the holding pattern at the hold departure time; and
- f) determine a new holding pattern straight leg distance using a new holding pattern straight leg time multiplied by a speed of the aircraft.

18. A non-transient computer-readable medium in accordance with claim 17, that includes a computer program that causes the processor to determine a difference between the time to complete the current hold orbit and the hold departure time.

19. A non-transient computer-readable medium in accordance with claim 17, wherein the computer program causes the processor to determine a new holding pattern straight leg time using a current holding pattern straight leg time less the amount of time by which to shorten the next orbit divided by a number of the plurality of straight legs.

20. A non-transient computer-readable medium in accordance with claim 17, wherein if a first new holding pattern straight leg distance is less than a minimum allowable straight leg distance, the computer program causes the processor to determine an adjustment to more than one holding pattern straight leg distance for more than one orbit.

* * * * *